United States Patent
Cavanagh

(12) 
(10) Patent No.: US 6,364,253 B1
(45) Date of Patent: Apr. 2, 2002

(54) REMOTE PILOTED VEHICLE POWERED BY BEAMED RADIATION

(75) Inventor: Richard A. Cavanagh, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/558,999

(22) Filed: Apr. 25, 2000

(51) Int. Cl.⁷ .......................... B64C 13/20; B64D 35/00
(52) U.S. Cl. ............................. 244/190; 244/60; 244/62
(58) Field of Search ................................ 244/189, 190, 244/60, 62

(56) References Cited

U.S. PATENT DOCUMENTS

| | | | | |
|---|---|---|---|---|
| 4,187,506 A | * | 2/1980 | Dickinson | 343/100 R |
| 4,697,761 A | * | 10/1987 | Long | 244/62 |
| 4,768,738 A | * | 9/1988 | Weinert | 244/62 |
| 5,503,350 A | * | 4/1996 | Foote | 244/190 |
| 5,810,284 A | * | 9/1998 | Hibbs et al. | 244/62 |
| 6,170,778 B1 | * | 1/2001 | Cycon et al. | 244/23 B |

\* cited by examiner

Primary Examiner—J. Woodrow Eldred
(74) Attorney, Agent, or Firm—Donald G. Peck; Harvey A. Gilbert

(57) ABSTRACT

An airborne remote piloted vehicle does not require onboard fuel to greatly extend its endurance and payload capability. Photovoltaic cells are provided on substantially the entire bottom surface of the RPV to receive high intensity radiation beamed up from a ground station. The photovoltaic cells can be made responsive to visible light, infrared light and/or ultraviolet light emitted from lasers that direct narrow, high energy beams, or other directable narrow beams of other wavelengths of high energy radiation, including but not limited to microwaves. The cells convert the beamed up radiation to power at least one electrical motor driven propeller and instrumentation for onboard components including sensors, lasers, radio transmitters, and associated instrumentations. Control signals may also be beamed up or otherwise transmitted to the vehicle to control its transport to and hovering at an on-station location and to activate the onboard components for reconnaissance, monitoring, and relaying data. Since RPV may be relatively small and the beamed-up and relayed radiation may be unseen, RPV may remain undetected on station for prolonged periods of time.

8 Claims, 2 Drawing Sheets

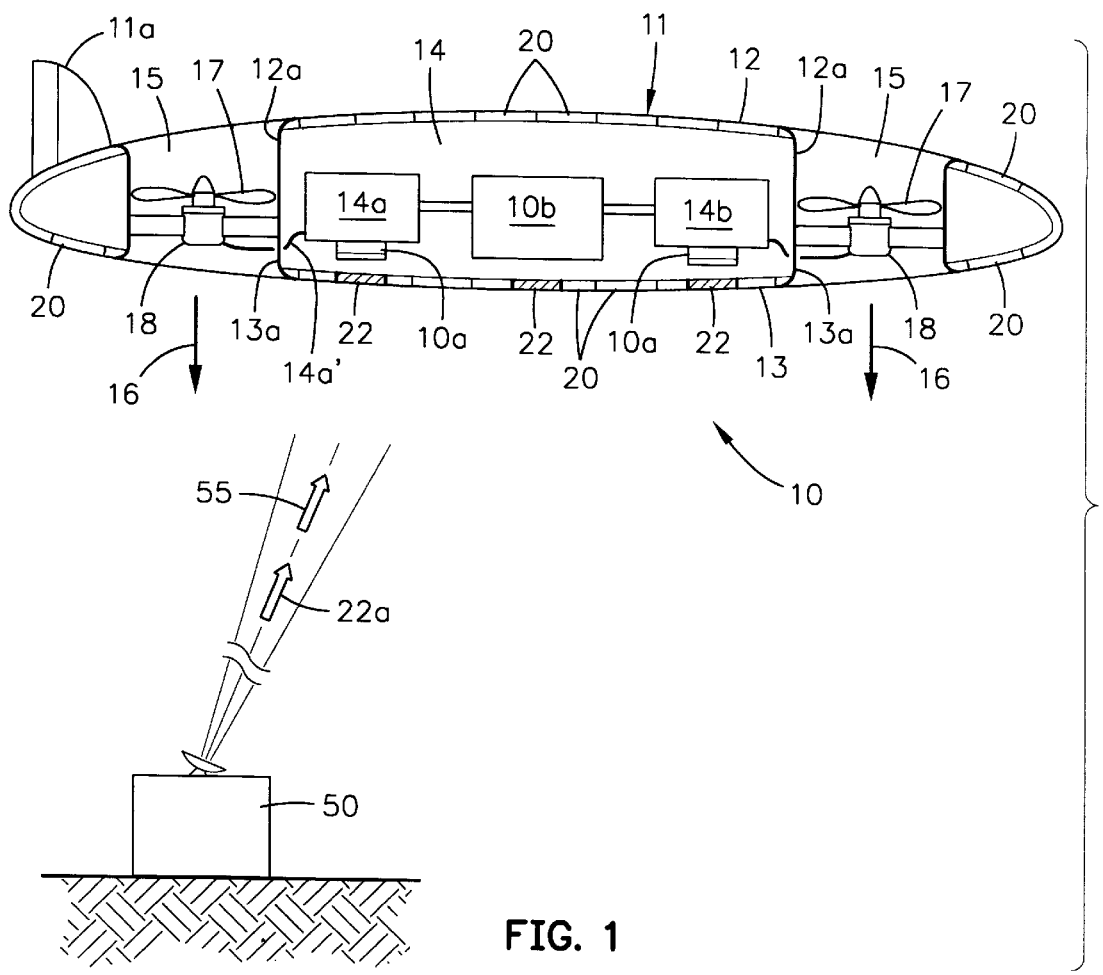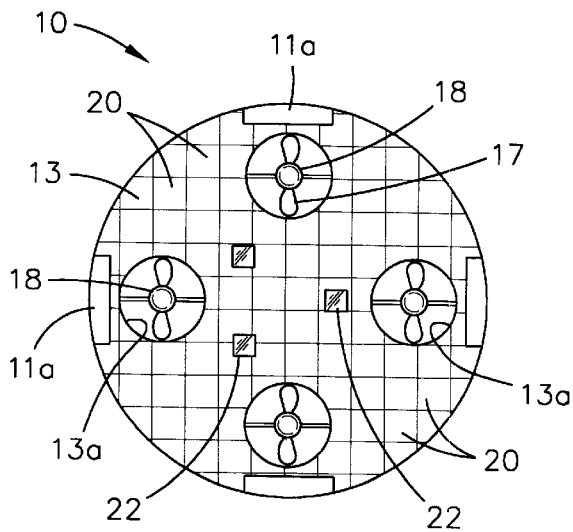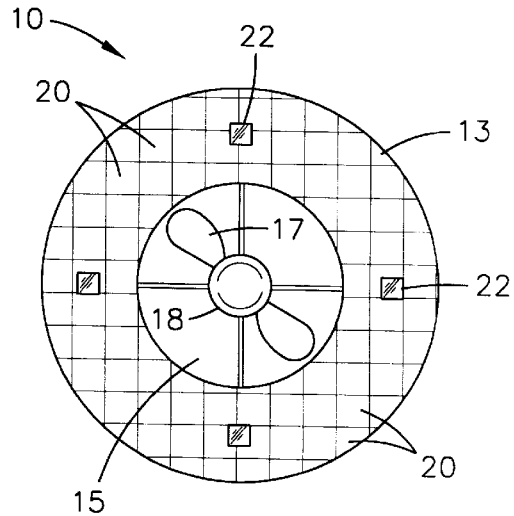
FIG. 1
FIG. 2
FIG. 3

REMOTE PILOTED VEHICLE POWERED BY BEAMED RADIATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to unpiloted aircraft. More particularly, this invention relates to aircraft energized by beamed-up radiation to permit hovering on-station for prolonged periods of time.

Remotely piloted vehicles are in widespread use in many different applications, such as serving as data monitors, reconnaissance platforms, and relay stations. Two big advantages of using RPVs are that they are not limited by the endurance limits of an onboard crew and do not expose an onboard crew to danger.

The designs of current airborne RPVs, however, inherently limit their payload, endurance, and other capabilities, such as data handling and data processing. These designs self-limit because they use space and weight to carry sufficient fuel for power for flight and instrumentation packages. If more fuel is needed, they must be made larger. Consequently, RPVs that are intended to be on station for any appreciable period of time are relatively large to such an extent that their size may betray their presence.

Thus, in accordance with this inventive concept, a need has been recognized in the state of the art for small airborne RPVs powered by radiation beamed up from earth to assure prolonged operation.

SUMMARY OF THE INVENTION

The present invention provides a saucer-shaped airborne remote piloted vehicle (RPV) and method of deployment that do not require an onboard fuel supply. Photovoltaic cells responsive to beamed radiation including visible light, infrared light, ultraviolet light and other wavelengths are mounted on the bottom side of the saucer-shaped vehicle. An electric motor coupled to a propeller in each traverse duct channels prop blast downward to transport, maneuver and hover the vehicle. The photovoltaic cells receive the beamed radiation and generate electrical power which is coupled to the electric motor and to other sensors, laser and radio transmitters, and associated instrumentations for prolonged periods. The method of deployment includes the steps of mounting photovoltaic cells on the bottom side of the vehicle and beaming radiation upward from a ground station onto the photovoltaic cells. Converting energy of the beamed radiation into electric power in the photovoltaic cells and coupling the electric power to at least one electric motor unit drives at least one propeller and creates prop wash from each propeller to transport, maneuver, and hover the vehicle.

An object of the invention is to provide an RPV capable of being on-station for prolonged periods.

Another object of the invention is to provide an RPV for reconnaissance, monitoring, and/or relaying data for prolonged periods.

Another object of the invention is to provide an RPV receiving radiation beamed up from a ground station.

Another object is to provide an RPV receiving power for flying and operating instrumentation from beams of radiation transmitted from a ground station.

Another object of the invention is to provide an RPV free of onboard fuel and powered by radiation beamed up from a ground station.

Another object of the invention is to provide an RPV free of onboard fuel and powered by radiation beamed up from a ground station to permit increased payloads.

Another object of the invention is to provide an RPV free of onboard fuel and powered by radiation beamed up from a ground station to permit loitering on-station for prolonged periods.

Another object of the invention is to provide an RPV having radiation responsive cells disposed on its bottom side to convert impinging beams of radiation from an earth station into electrical power for operation and/or control.

Another object of the invention is to provide an RPV having radiation responsive cells disposed on its bottom side to convert beams of radiation from an earth station into electrical power to drive propulsion motors, electronics and associated instrumentations.

Another object of the invention is to provide a saucer-shaped remote piloted vehicle having radiation responsive cells disposed on its bottom side to convert beams of radiation from an earth station into electrical power for controlling and/or powering propulsion motors, electronics, and associated instrumentations.

Another object of the invention is to provide an airplane-shaped RPV having radiation responsive cells disposed on its ventral side to convert impinging beams of radiation from earth stations into electrical power for controlling and powering propulsion motors, electronics, and associated instrumentations.

Another object of the invention is to provide an RPV having radiation responsive cells disposed on its ventral side to convert impinging beams of radiation transmitted from an earth station, another RPV or satellite into electrical power.

Another object of the invention is to provide an RPV having radiation responsive cells disposed on its bottom side to convert impinging beams of radiation transmitted from an earth station, another RPV, or satellite into electrical power for onboard motors, electronics and instrumentations and into command-control signals therefor.

Another object of the invention is to provide a cost-effective RPV used for reconnaissance, monitoring, and/or relay of data that is not limited by the endurance limits of an onboard crew and does not expose an onboard crew to danger.

These and other objects of the invention will become more readily apparent from the ensuing specification when taken in conjunction with the appended claims.

BRIEF DESCRIPTION OF THE DRAWINGS

FIG. 1 is a cross sectional view of one embodiment of a saucer-shaped RPV on station and receiving beamed-up photons of radiation from a ground station according to this invention.

FIG. 2 is a bottom view of the embodiment of FIG. 1 showing details of the saucer.

FIG. 3 is a bottom view of another embodiment of the invention.

DESCRIPTION OF THE PREFERRED EMBODIMENTS

Figure 4:
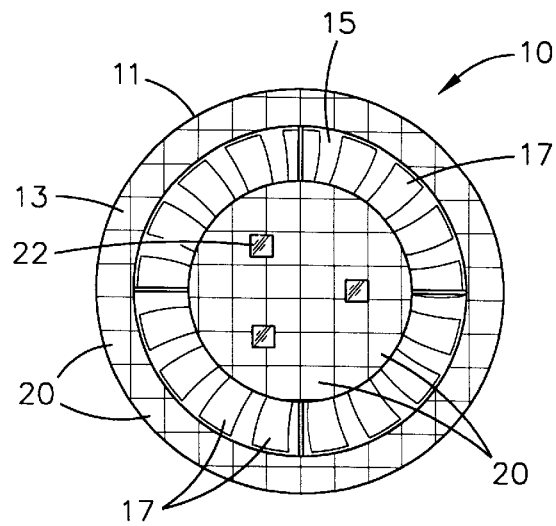
FIG. 4 is a bottom view of another embodiment of this invention.

Referring now to FIGS. 1 and 2, remote piloted vehicle (RPV) 10 is a saucer-shaped unattended airborne platform for long term reconnaissance, monitoring, and data-relay. Like contemporary RPVs, RPV 10 is not limited by the endurance limits of an onboard crew and does not have an onboard crew that might be exposed to danger.

RPV 10 is specifically designed to do away with an onboard fuel supply. This feature frees RPV 10 from space and weight constraints and provides benefits and capabilities beyond contemporary RPVs. Consequently, RPV 10 can be made smaller, yet carry greater payloads such as onboard electronics and associated instrumentations. These onboard electronics and associated instrumentations may include optical, infrared, ultraviolet and other radiation sensors 10a and laser/radio transceiver packages 10b that may include a laser, detector for coherent radiation, radio signal transmitter-receiver, and associated electronics, for examples. In addition, RPV 10 can loiter or hover on-station over a designated area almost indefinitely, e.g. in excess of days and nights, which is far longer than conventionally fueled RPVs can.

RPV 10 has rounded, somewhat planar, or saucer-shaped fuselage 11 that may include control surfaces 11a that could act as ailerons, rudders, and elevators. Upwardly facing top side 12 and downwardly facing bottom side 13 of fuselage 11 may each be made from lightweight and strong metals or plastic sheets of material configured in a flattened conical, or saucer-like shape. Top side 12 and bottom side 13 are joined together around their peripheries in mirror-image mating and create hollow interior 14 for housing electronics and associated components 14a and 14b for control, propulsion, sensing, and communications for electric motors 18, propellers 17, sensors 10a and laser/radio transceiver packages 10b. Suitable bracing and other structural members (not shown) mount these internal elements to assure reliable integrity and long-term operation.

Figure 5:
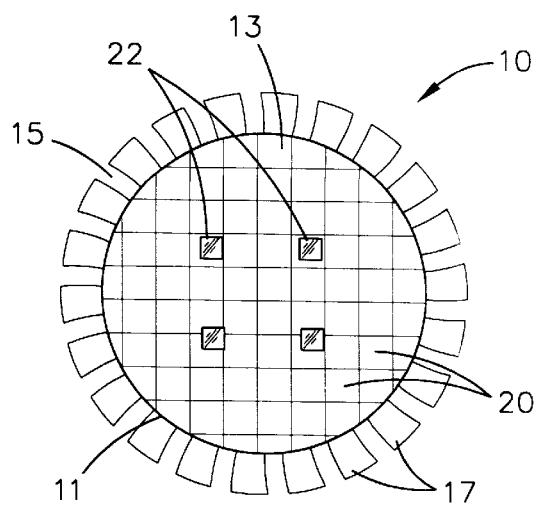
FIG. 5 is a bottom view of another embodiment of this invention.

Top and bottom sides 12 and 13 have openings 12a and 13a respectively for one or more traverse passageways or ducts 15 that extend through fuselage 11. Ducts 15 may have a variety of different shapes, such as a single round duct having a larger propeller 17 (also see FIG. 3), ring-shaped duct having an annular series of propellers 17, (also see FIG. 4) open-sided annular duct having an annular series of propellers 17, (also see FIG. 5), elliptical, etc. Irrespective of the shape of the ducts, each duct 15 channels and directs the flow of prop wash 16 from aerodynamic lift fans (one or more, conventional or counter rotating, fixed or variable pitched propellers 17).

Whatever design is selected, prop wash 16 selectively lifts, suspends, maneuvers, and hovers RPV 10 on station using power from electric motor unit 18 that is coupled to propeller 17 in each duct 15. Optionally, each electric motor unit 18 may be located in interior 14 of fuselage 11 and joined by a drive train (not shown) to propeller 17 in duct 15.

In accordance with this invention a plurality of photovoltaic cells 20 are disposed on bottom side 13 to convert photons of radiation 55 into electric power. Photons of radiation 55 are beamed up and onto photovoltaic cells 20 on bottom side 13 from one or more ground stations 50. Photovoltaic cells 20 may cover substantially the entire area of bottom side 13 except where ducts 15 extend through its surface and where several ports, or windows 22 receive and transmit signals 22a. Photovoltaic cells 20 are sensitive to photons of high energy beams of impinging radiation 55 from ground stations 50 to generate electrical power for electric motor units 18 and the other electrical power utilizing elements onboard RPV 10. This almost flat disc-shaped expanse of bottom side 13 assures that sufficient quantities of photovoltaic cells 20 are provided to meet the power needs of RPV 10 to sustain prolonged operation. The sensitivities of photovoltaic cells 20 may be selected to be responsive to radiation that cannot be seen so that unseen day and/or night operation is possible. Optionally, photovoltaic cells 20 also can be disposed on top side 12 to convert power of high energy beams of impinging radiation 55 from a laser in space, such as on a satellite, or an orbiting mirror reflecting such energy beams from ground station 50.

Radiation 55 may be light including visible light, infrared light and/or ultraviolet light emitted from lasers that direct narrow, high energy beams. Other directable narrow beams of other wavelengths of high energy radiation, including but not limited to microwaves, might also be used. Radar or other sophisticated navigational aids, such as global positioning system, for example can be used to locate RPV 10 so that beamed radiation 55 can be effectively utilized. Since stations 50 are capable of generating beamed high-energy radiation 55 for prolonged periods of time that could extend indefinitely, the on-station loitering time of hovering RPV 10 is more likely to be determined by the life cycle of its parts and not the amount of onboard fuel.

Windows 22 on RPV 10 pass optical, infrared, ultraviolet, and other select radiations including radio transmissions through bottom side 13. This allows sensors 10a and associated instrumentations in interior 14 to "see" the ground and airspace beneath and within the "shadow" of RPV 10, receive control signals 22a, and transmit data that may be from either laser portion or radio transceiver portion of laser/radio transceiver package 10b to ground stations 50.

Control signals 22a that are received through windows 22 may be in the form of narrow beams or omnidirectionally radiated signals and other modulated radiations coming from ground stations 50, aircraft, or satellites. Control signals 22a could be sent up in the same beams as beamed radiation 55 and could be modulations of beamed radiation 55. This mode of transmission could make the information content of control signals 22a more secure from being read by a third party and tend to reduce the possibility of jamming.

Control signals 22a are used for controlling the rate of power delivered over leads 14a' coupled to each electric motor unit 18 and to control surfaces 11a on RPV 10. Thus, RPV 10 is maneuvered to a desired location and to kept on-station for the duration of an operation. Control signals 22a are also used to activate sensors 10a, laser/radio transceiver package 10b, and electronics and associated equipments 14a and 14b in interior 14 to carry out a mission. Furthermore, control windows 22 could be used to transmit and receive coherent signals from onboard laser or detector portion of laser/radio transceiver package 10b to or from one or more ground stations 50, or to illuminate a ground target. Control windows 22 might be used with the radio portion of laser/radio transceiver package 10b to relay data from monitored activities or other vehicles 10 hovering at distant locations.

RPV 10 is designed to perform its tasks unnoticed by others. It is designed to be as small, lightweight, and unobservable as it practicably can be. Since relatively bulky and heavy fuel is eliminated by this invention, this intent has manifested in its novel design that has resulted in scaling to model airplane dimensions and utilizing lightweight and strong composite materials. Typically saucer-shaped fuselage 11 may have a diameter from about five to sixty-six feet in diameter and a payload from about two to two hundred pounds. Larger and smaller dimensions and weights for RPV 10 may be arrived at depending on mission requirements and materials available.

Figure 6:
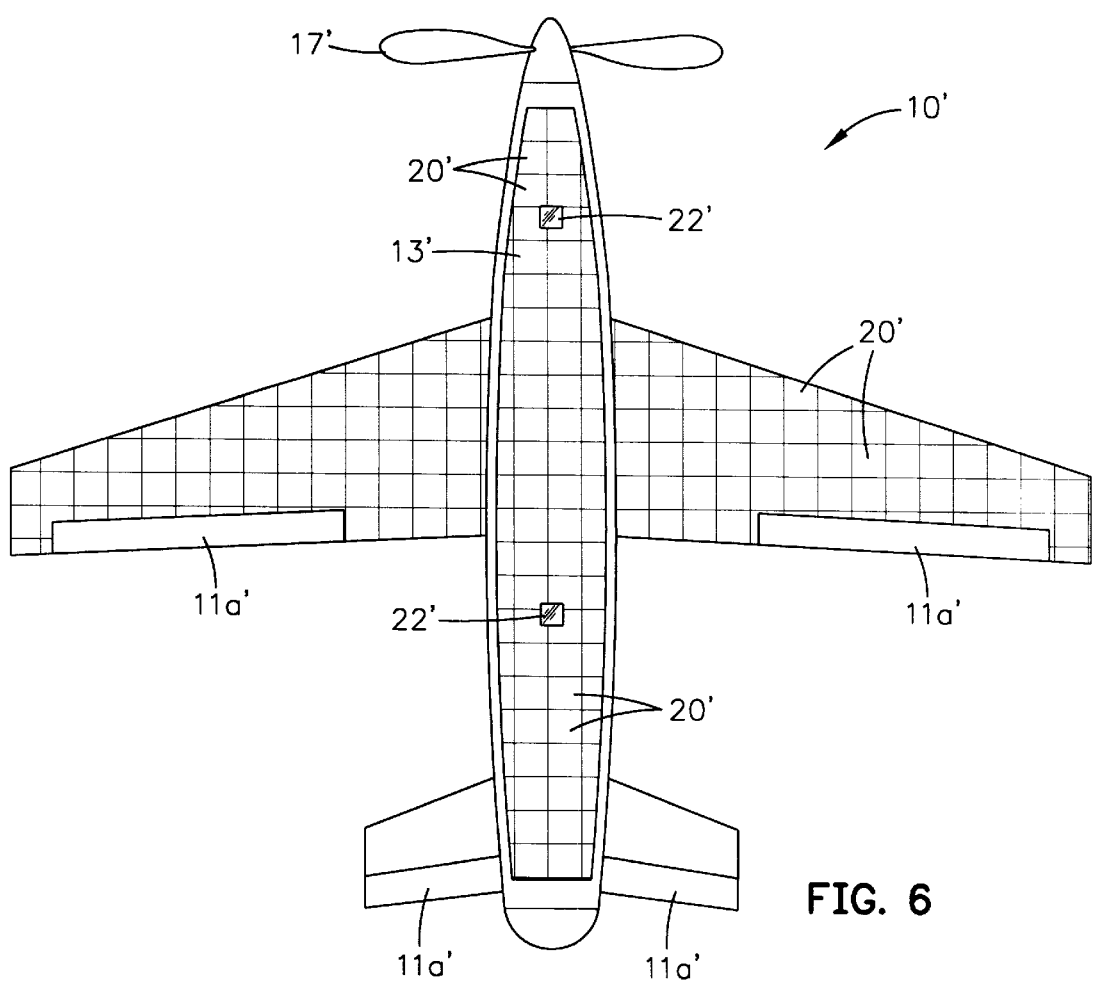
FIG. 6 depicts a bottom view of an airplane-shaped embodiment.

Referring also to FIG. 6, RPV 10' is built along the lines of a model airplane having a conventional propeller 17' and control surfaces 11a'. Photovoltaic cells 20' on bottom side 13' receive photons of high energy beamed radiation 55 and convert them into electrical power for sensors, instrumentation, and power for the electric motor unit (not shown) for propeller 17'. Windows 22' allow the sensors and associated instrumentations to "see" the ground and airspace beneath and within the "shadow" of RPV 10', receive control signals and transmit data to ground stations 50. Another option is to build RPV 101 having photovoltaic cells 20' and windows 22' on the bottom of a propeller-driven, airfoil-shaped, flying wing (not shown).

In operation, RPV 10 is flown to its intended loitering station by radiation 55 and control signals 22a beamed up to it, or it may be carried aloft by an airplane, rocket, or balloon to save time, wear, and tear. After it has been carried to the vicinity of its station, it may be released and radiation 55 and control signals 22a are beamed up to it to finalize its journey. If RPV 10 hovers at 60,720 foot altitude, for example, it has the capability to "see" anything within the "shadow" of a 300-mile radius circle. In addition, RPV 10 can communicate in line of sight with anything receptive in the 300-mile radius circle so that any responsive person or sensor in this circle can "talk" to it.

Each RPV 10 is made from lightweight, strong, noncorrosive, or corrosion resistant materials in accordance with sound aerospace engineering design criteria to withstand the rigors of the harsh environment at high altitude. Suitable construction and reinforcing techniques are followed throughout RPV 10 to produce an airborne platform that hovers unattended for prolonged durations.

A system of RPVs 10 of this invention may be located in various patterns at high altitudes to monitor activity, relay data, provide navigational aids, etc. For example, a system could include a single ground station 50 that could beam high energy radiation 55 and control signals 22a to three RPVs 10 at 60,720 foot altitude. These three RPVs 10 may be disposed in line with one another, and adjacent ones of vehicles 10 are separated by 300 miles. If ground station 50 were directly beneath the center vehicle 10, then this single station 50 would have the capability of monitoring and relaying data over air and ground space measuring roughly 1200 by 600 miles! Several such systems could be deployed in a line that could extend for thousands of miles across a frontier or around an entire country. Planners can modify these arrangements of RPVs 10 and add-to, take-from, move, and/or reorient them to accommodate changes in the activities associated with monitoring and relaying data. Since vehicles 10 may be small and cost effective; they can be flown home and later relocated, or simply destroyed by detonating an onboard explosive charge after their period of usefulness has passed.

Having the teachings of this invention in mind, modifications and alternate embodiments of this invention may be adapted. For examples, the sizes and shapes of RPV 10 could be changed to adjust to different missions; different construction materials may be used in RPV 10 to make it less visible to third parties; and suitable heating or cooling measures and subsystems may need to be included to combat extreme temperatures.

The disclosed components and their arrangements as disclosed herein all contribute to the novel features of this invention. This invention provides a cost-effective way to monitor activities and relay data for prolonged periods of time. Therefore, RPV 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

What is claimed is:

1. A remote piloted vehicle comprising:
   a saucer-shaped fuselage having at least one traverse duct extending from top to bottom for channeling prop blast downward;
   a propeller disposed in said duct;
   an electric motor unit coupled to said propeller to drive said propeller and generate said prop blast, said prop blast permiting transport to and hovering at a remote station; and
   a plurality of photovoltaic cells disposed on a bottom side of said saucer-shaped fuselage to receive beamed radiation and to generate electrical power from said beamed radiation, said photovoltaic cells coupling said electric power to said electric motor unit to transport to and hover at said station for prolonged periods of time.

2. A remote piloted vehicle according to claim 1 further comprising:
   at least one window on said bottom side to receive control signals for said electrical motor unit to transport and hover said remote piloted vehicle.

3. A remote piloted vehicle according to claim 2 further comprising:
   at least one sensor, laser/radio transmitter package, and electronics with associated equipments disposed adjacent said window and coupled to receive said electrical power.

4. A remote piloted vehicle according to claim 3 wherein said window is capable of transmitting coherent signals to and from onboard detector portion and laser portion of said laser/radio transmitter package and transmitting radio signals to and from a transceiver portion of said radio/transmitter package.

5. A remote piloted vehicle according to claim 4 wherein said coherent signals and radio signals are transmittable to and from at least one ground station, a ground target, monitored activities, and other hovering airborne vehicles.

6. A system according to claim 5 further comprising:
   a plurality of traverse ducts extending from said top to said bottom in said saucer-shaped fuselage for channeling prop blast downward;
   a propeller disposed in each of said ducts to generate said prop blast;
   a separate electric motor unit coupled to drive each propeller, said electric power being coupled to each electric motor unit; and
   a plurality of windows on said bottom side of said saucer-shaped fuselage to receive control signals for said electrical motor units to fly to and hover at said station.

7. A remote piloted vehicle according to claim 5 further comprising:
   a second plurality of photovoltaic cells on a top side of said saucer-shaped fuselage receiving radiation beamed downward from other platforms and converting energy of said downward beamed radiation into other electric power in said second plurality of photovoltaic cells, said other electrical power being coupled to said electric motor unit and said sensor, laser/radio transmitter package, and electronics with associated equipments.

8. A remote piloted vehicle according to claim 6 further comprising:
   a second plurality of photovoltaic cells on a top side of said saucer-shaped fuselage receiving radiation beamed downward from other platforms and converting energy of said downward beamed radiation into other electric power in said second plurality of photovoltaic cells, said other electrical power being coupled to each electric motor unit and said sensor, laser/radio transmitter package, and electronics with associated equipments.

* * * * *